US008175392B2

(12) United States Patent
Iwamoto et al.

(10) Patent No.: US 8,175,392 B2
(45) Date of Patent: May 8, 2012

(54) TIME SEGMENT REPRESENTATIVE FEATURE VECTOR GENERATION DEVICE

(75) Inventors: Kota Iwamoto, Tokyo (JP); Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/143,673

(22) PCT Filed: Jan. 19, 2010

(86) PCT No.: PCT/JP2010/000247
§ 371 (c)(1),
(2), (4) Date: Jul. 7, 2011

(87) PCT Pub. No.: WO2010/087125
PCT Pub. Date: Aug. 5, 2010

(65) Prior Publication Data
US 2011/0274359 A1 Nov. 10, 2011

(30) Foreign Application Priority Data

Jan. 29, 2009 (JP) ................................. 2009-017807

(51) Int. Cl.
*G06K 9/46* (2006.01)
(52) U.S. Cl. ........................................ 382/190; 382/276
(58) Field of Classification Search ........... 382/100–312
See application file for complete search history.

(56) References Cited

U.S. PATENT DOCUMENTS

| 5,598,216 A * | 1/1997 | Lee | 382/241 |
| 5,612,743 A * | 3/1997 | Lee | 382/243 |
| 6,404,925 B1 * | 6/2002 | Foote et al. | 382/224 |
| 6,859,554 B2 * | 2/2005 | Porikli et al. | 382/173 |
| 2001/0043659 A1 | 11/2001 | Kurozumi et al. | |

FOREIGN PATENT DOCUMENTS

| JP | 2002-044610 A | 2/2002 |
| JP | 2006-351001 A | 12/2006 |
| JP | 2007-336106 A | 12/2007 |

OTHER PUBLICATIONS

Eiji Kasutani, et al., Video Material Archive System for Efficient Video Editing Based on Media Identification, IEEE International Conference on Multimedia and Expo (ICME), 2004, pp. 727-730.
Kunio Kashino, et al., "A Quick Search Method for Audio and Video Signals Based on Histogram Pruning", IEEE Transactions on Multimedia, Sep. 2003, pp. 348-357, vol. 5, No. 3.
Anil Jain, et al., "Query by Video Clip", Proc. on ICPR (International Conference on Pattern Recognition), Aug. 1998, pp. 16-20, vol. 1.
Yusuke Uchida, et al., "A Study on Content Based Copy Detection Using Color Layout", Proc. on IMPS (Image Media Processing Symposium) 2008, Proceedings, Oct. 2008, pp. 69-70.
Eiji Kasutani, "Acceleration of Video Identification Process using Group-of-Frame Feature", Proc. on FIT (Forum on Information Technology), 2003, pp. 85-86.

* cited by examiner

*Primary Examiner* — Manav Seth
(74) *Attorney, Agent, or Firm* — Sughrue Mion, PLLC

(57) ABSTRACT

The time segment representative feature vector generation device includes an intra-time segment feature vector group selection means for selecting, for each time segment and from a feature vector series for respective frames, feature vectors of a plurality of frames included in a time segment; and a dimension selection means for selecting, for each time segment and from the selected feature vectors of different frames in the time segment, features of different dimensions of the feature vectors, and generating a time segment representative feature vector which is a feature vector representing the time segment.

17 Claims, 16 Drawing Sheets

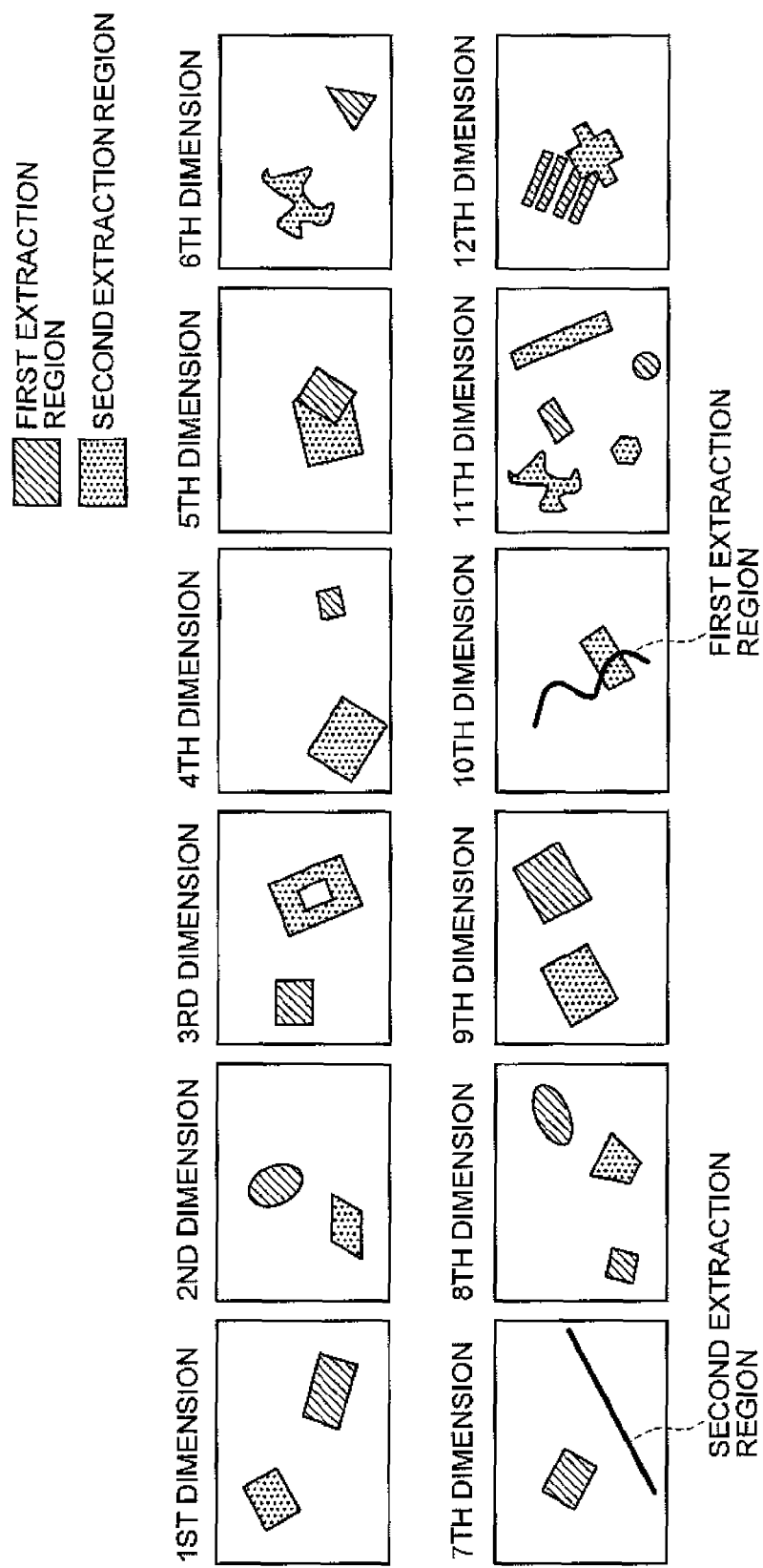

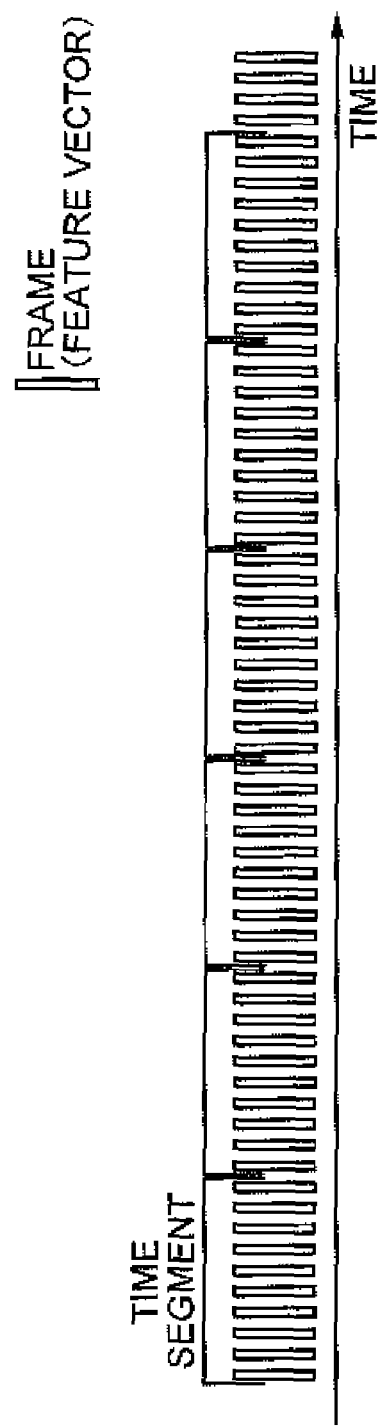
FIG. 3-A

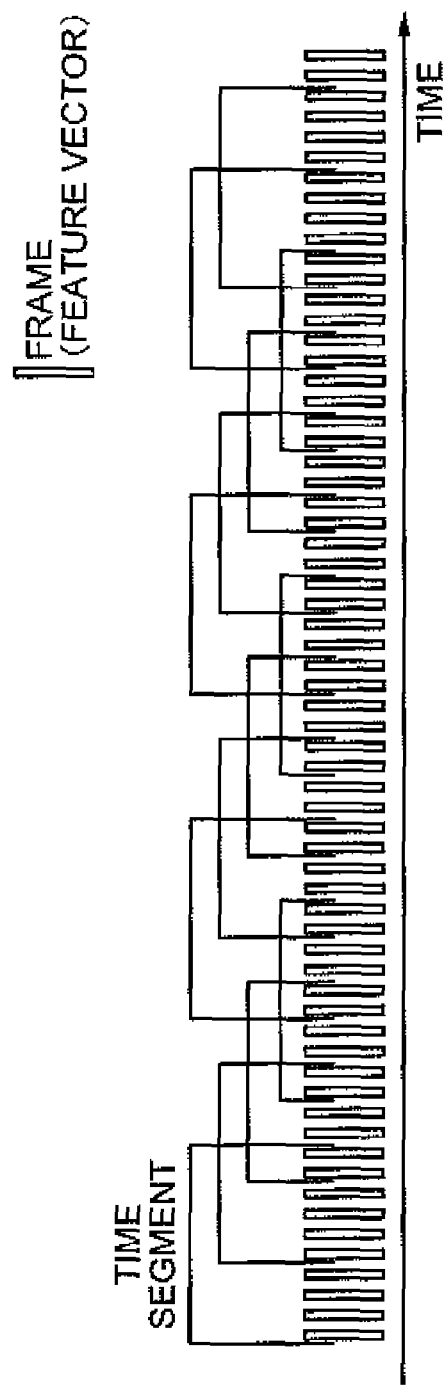
FIG. 3-B

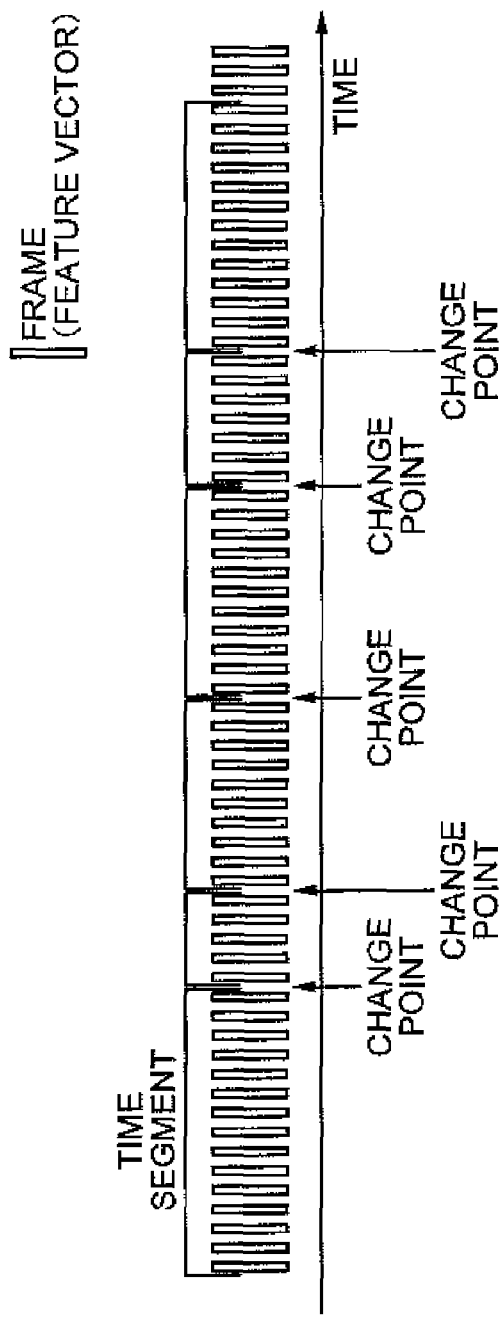
FIG. 3-C

TIME SEGMENT REPRESENTATIVE FEATURE VECTOR GENERATION DEVICE

CROSS REFERENCE TO RELATED APPLICATIONS

This application is a National Stage of International Application No. PCT/JP2010/000247 filed Jan. 19, 2010, claiming priority based on Japanese Patent Application No. 2009-17807, filed Jan. 29, 2009, the contents of all of which are incorporated herein by reference in their entirety.

TECHNICAL FIELD

The present invention relates to a device and a method for generating, for each time segment, a feature vector representing the time segment from a series of feature vectors of respective frames indicating time-series data such as moving image data and acoustic data. In particular, the present invention relates to a time segment representative feature vector generation device, a time segment representative feature vector generation method, and a time segment representative feature vector generation program, for generating a time segment representative feature vector capable of describing time-series changes in a time segment.

BACKGROUND ART

As a similar segment retrieval technique for retrieving (discriminating) a time segment having similar features from a series of feature vectors of respective frames indicating time-series data such as moving image data and acoustic data, there has been known a method of specifying similar time segments by sequentially performing matching on two sets of feature vector series to be compared (calculating a similarity or a distance) in frame units. For example, Non-Patent Document 1 describes that a distance calculation is performed in frame units using Color Layout Descriptor, defined in ISO/IEC 15938-3, as a feature vector of each frame, to thereby discriminate a similar segment.

The method of performing matching between the feature vector series to be compared requires a long period of time for retrieval. As such, in order to speed up the retrieval, another method has been proposed, in which a feature vector representing a time segment (referred to as a time segment representative feature vector) is generated for each time segment including a plurality of frames, and matching is performed using the generated time segment representative feature vectors, rather than performing matching in frame units.

For example, Non-Patent Document 2 describes generating a histogram feature from feature vectors included in a time segment as a time segment representative feature vector. Specifically, as a feature vector for each frame of a moving image, a frame image is divided into a plurality of sub images, and color component values (R component, G component, and B component) of each of the sub-images are used as the features thereof. The feature vectors of the frames included in a time segment are quantized, and a time segment representative feature vector is generated as a histogram indicating the appearance frequency of the respective quantization indexes.

Non-Patent Document 3 and Non-Patent Document 4 describe that as a time segment representative feature vector, a key frame within a time segment is selected and a feature vector of the selected key frame is directly used as the time segment representative feature vector. In these documents, a shot of a moving image is used as a time segment, and a key frame is selected from the shot, and a feature vector thereof is used as a time segment representative feature vector.

Non-Patent Document 5 describes that from feature vectors of a plurality of frames included in a time segment, mean values or median values for respective dimensions of the feature vectors are calculated, and a feature vector constituted of the calculated mean values or the median values is used as a time segment representative feature vector.

Non-Patent Document 1: Eiji Kasutani, Ryoma Oami, Akio Yamada, Takami Sato, and Kyoji Hirata, "Video Material Archive System for Efficient Video Editing based on Media Identification", Proc. on ICME (International Conference on Multimedia and Expo) 2004, Vol. 1, pp. 727-730, June 2004.

Non-Patent Document 2: Kunio Kashino, Takayuki Kurozumi, Hiroshi Murase, "A Quick Search Method for Audio and Video Signals Based on Histogram Pruning", IEEE Transactions on Multimedia, Vol. 5, No. 3, September 2003.

Non-Patent Document 3: Anil Jain, Aditya Vailaya, and Wei Xiong, "Query by Video Clip", Proc. on ICPR (International Conference on Pattern Recognition), Vol. 1, pp. 16-20, August 1998.

Non-Patent Document 4: Yusuke Uchida, Masaru Sugano, Akio Yoneyama, "A Study on Content Based Copy Detection Using Color Layout", Proc. on IMPS (Image Media Processing Symposium) 2008, Proceedings, pp. 69-70, October 2008.

Non-Patent Document 5: Eiji Kasutani, Akio Yamada, "Acceleration of Video Identification Process Using Group-of-Frame Feature", Proc. on FIT (Forum on Information Technology) 2003, pp. 85-86, 2003.

SUMMARY

However, the time segment representative feature vectors described in Non-Patent Documents 2 to 5 are unable to describe time-series changes (temporal changes) in a feature vector series within a time segment. As such, because matching with use of the above-described time segment representative feature vector is unable to discriminate time-series changes within a time segment (a possibility of determining feature vector series having different time-series changes to be similar is high), there is a problem that accuracy of retrieving a feature vector series is lowered.

Specifically, in the method of using a histogram feature of the feature vectors included in a time segment as a time segment representative feature vector, as described in Non-Patent Document 2, because the histogram is unable to describe the time-series order, time-series changes in the feature vector series within a time segment cannot be described (for example, the same histogram is generated even if the time-series changes are in the reverse order).

Further, in the method of selecting a key frame in a time segment and directly using the selected key frame as a time segment representative feature vector, as described in Non-Patent Document 3 and Non-Patent Document 4, as a feature vector of a selected single frame is used, only information on one point on the time series is described. As such, time-series changes in the feature vector series within a time segment cannot be described.

Further, in the method of calculating, from feature vectors of a plurality of frames included in a time segment, mean values or median values for respective dimensions of the feature vectors, and using a feature vector constituted of the calculated mean values or the median values as a time segment representative feature vector, as described in Non- Patent Document 5, as the value for each dimension of the calculated time segment representative feature vector has no correspondence relation with the position (time) on the time series in the time segment, time-series changes in the feature vector series within the time segment cannot be described (for example, the same segment representative vector is generated even if the time-series changes are in the reverse order).

OBJECT OF THE INVENTION

An object of the present invention is to provide a time segment representative feature vector generation device capable of solving a problem that the time segment representative feature vectors described in Non-Patent Documents 2 to 5 are unable to describe time-series changes (temporal changes) in the feature vector series within a time segment.

A time segment representative feature vector generation device, according to an aspect of the present invention, includes an intra-time segment feature vector group selection means for selecting, for each time segment and from a feature vector series for respective frames, feature vectors of a plurality of frames included in a time segment; and a dimension selection means for selecting, for each time segment and from the selected feature vectors of different frames in the time segment, features of different dimensions of the feature vectors, and generating a time segment representative feature vector which is a feature vector representing the time segment.

According to the present invention, it is possible to provide a time segment representative feature vector generation device for generating a time segment representative feature vector capable of describing time-series changes in a feather vector series within a time segment from the feature vector series of respective frames of time-series data. By using a time segment representative feature vector capable of describing time-series changes in a time segment as described above, it is possible to improve the accuracy of retrieving a feature vector series by means of the time segment representative feature vector.

BRIEF DESCRIPTION OF DRAWINGS

FIG. 2 illustrates multi-shape region comparison features.

FIG. 3-A shows an exemplary method of defining a time segment.

FIG. 3-B shows another exemplary method of defining a time segment.

FIG. 3-C shows still another exemplary method of defining a time segment.

EXEMPLARY EMBODIMENTS

Next, embodiments of the present invention will be described in detail with reference to the drawings.

First Embodiment

Figure 1:
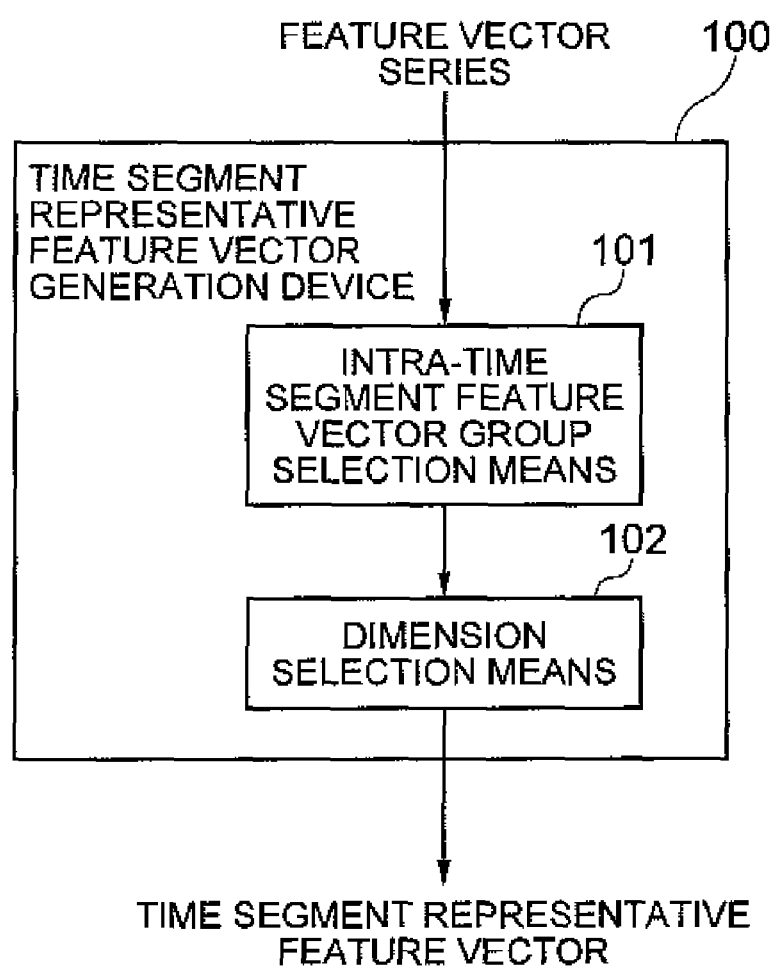
FIG. 1 is a block diagram showing the configuration of a first embodiment of the present invention.

Referring to FIG. 1, a time segment representative feature vector generation device 100 according to a first embodiment of the present invention receives a series in which feature vectors of respective frames are arranged in time-series order (feature vector series), and outputs a time segment representative feature vector which is a feature vector representing the time segment. The time segment representative feature vector generation device 100 includes an intra-time segment feature vector group selection means 101 and a dimension selection means 102.

When a series of feature vectors are input, the intra-time segment feature vector group selection means 101 selects, for each time segment, feature vectors of a plurality of frames included in the time segment, and supplies information of the feature vectors of the frames selected for each time segment to the dimension selection means 102.

The feature vector series to be input is a series in which feature vectors for respective frames of time-series data such as moving image data and acoustic data are arranged in time-series order. Data is not limited to moving image data and acoustic data if it is time-series data. In this context, a frame means each element of time-series data, and even in the case of time-series data other than moving image data or acoustic data, each element of the time-series data is referred to as a frame for the sake of simplicity.

A feature vector for each frame is constituted of features of a plurality of dimensions. For example, in the case of moving image data, the features may be various visual features defined in ISO/IEC 15938-3 (so-called MPEG-7 Visual) extracted for each frame of the moving image, such as Dominant Color, Color Layout, Scalable Color, Color Structure, Edge Histogram, Homogeneous Texture, Texture Browsing, Region Shape, Contour Shape, Shape 3D, Parametric Motion, and Motion Activity.

Further, in the case of moving image data, the features of a plurality of dimensions constituting a feature vector for each frame are desirably features improved to have effectiveness with respect to a wider variety of types of moving images. An example thereof will be described with reference to FIG. 2.

FIG. 2 is an illustration showing an extraction method of exemplary features (hereinafter referred to as multi-shape region comparison features) which are improved to be effective with respect to a wide variety of types of moving images. For multi-shape region comparison features, two extraction regions (a first extraction region and a second extraction region) within an image are set beforehand to extract features for each dimension of a feature vector. The multi-shape region comparison features are characterized in that the shapes of the extraction regions have variations. In order to extract multi-shape region comparison features, calculating, for each dimension, mean luminance values of the first extraction region and the second extraction region set for each dimension, comparing the mean luminance value of the first extraction region with the mean luminance value of the second extraction region (that is, based on a difference value), and quantizing the difference into three values (+1, 0, −1) to thereby obtain an quantization index. If the absolute value of the difference value between the mean luminance value of the first extraction region and the mean luminance value of the second extraction region is lower than or equal to a predetermined threshold, it is determined that the mean luminance values of the first extraction region and the second extraction region have no difference, so that a quantization index is set to be 0, which indicates no difference. In other cases, the mean luminance value of the first extraction region and the mean luminance value of the second extraction region are compared, and if the mean luminance value of the first extraction region is larger, the quantization index is set to be +1, while the quantization index is set to be −1 in other cases. Assuming that the mean luminance value of the first extraction region is Vn1 and the mean luminance value of the second extraction region is Vn2 in a dimension n and a predetermined threshold is th, the quantization index Qn in the dimension n can be calculated from the following expression.

$$Qn = +1 \text{ (if } |Vn1-Vn2|>th \text{ and } Vn1>Vn2)$$

$$0 \text{ (if } |Vn1-Vn2| \leq th)$$

$$-1 \text{ (if } |Vn1-Vn21>th \text{ and } Vn1 \leq Vn2)$$

In the case of acoustic data, for example, a feature vector may be calculated by performing a frequency analysis with respect to an acoustic frame (analysis window including a plurality of sampling signals). For example, a feature vector may be obtained in such a manner that Fourier transform is performed on an analysis window to calculate a power spectrum of the frequency region, and the power spectrum is divided into a plurality of sub-bands, and the value of the average power of each sub-band is used as a feature.

It should be noted that time segments mean continuous segments on the time axis. In the intra-time segment feature vector group selection means 101, any methods can be used to define time segments if it is constant with respect to all input feature vector series.

For example, time segments may be respective segments obtained by dividing the time axis by a constant time length (time width). Referring to the example of FIG. 3-A for example, respective segments divided in 10 frame units, which is a constant time width, on the feature vector series (frame series) are defined as time segments. Also, respective segments divided in one second units, which is a constant time length, may be defined as time segments.

Further, time segments may be defined by shifting segments of a constant time length (time width) at regular intervals so as to allow overlaps between the segments. Referring to the example of FIG. 3-B for example, time segments may be defined in such a manner that time segments in 10 frame units, which is a constant time width, are shifted at 4 frame intervals on the feature vector series (frame series) so as to allow overlaps between the segments. Further, time segments may be set by shifting segments in one second units, which is a constant time length, at one frame intervals so as to allow overlaps between the segments.

Further, the time segments do not necessary have a constant time length (time width). For example, as in the example of FIG. 3-C, it is possible to detect change points (e.g., shot dividing points of moving image data) with respect to a feature vector series (frame series) and set respective segments between the respective change points as time segments. The change points may be detected from the feature vector series itself (for example, calculating a distance between the feature vectors of adjacent frames and if the distance exceed a predetermined threshold, it is determined to be a change point), or detected from the original time-series data.

Figure 4:
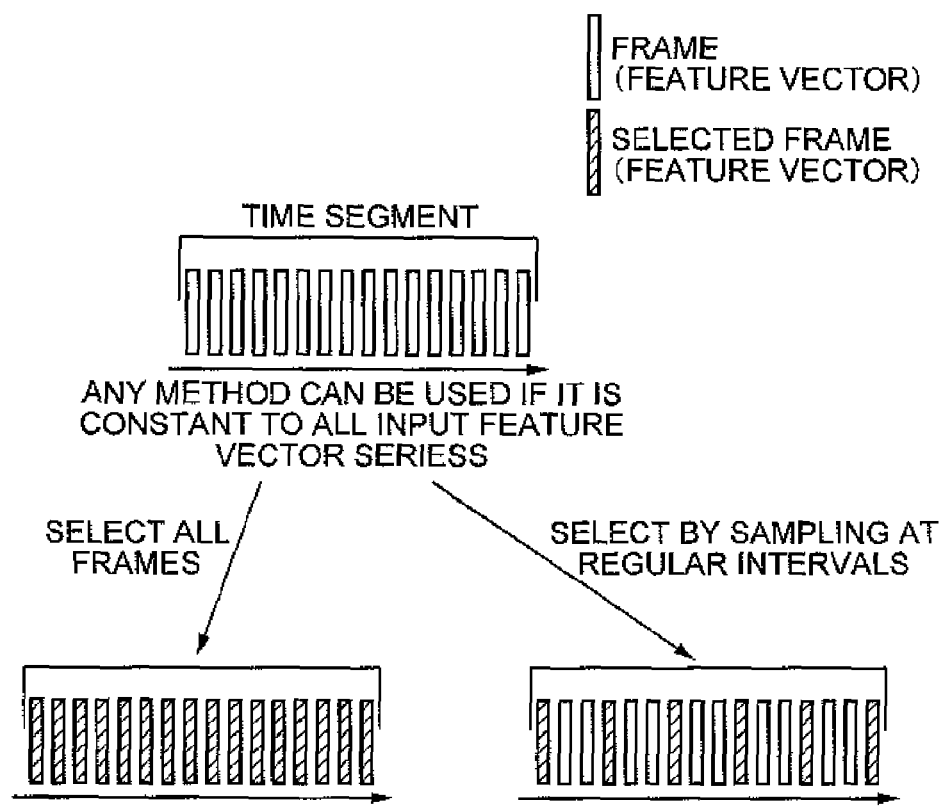
FIG. 4 shows an exemplary method for selection by an intra-time segment feature vector group selection unit in the first embodiment of the present invention.

In the intra-time segment feature vector group selection means 101, any methods may be used for selecting, for each determined time segment, feature vectors of a plurality of frames included in the time segment, if it is constant to every input feature vector series. For example, the intra-time segment feature vector group selection means 101 may select the feature vectors of all frames included in the time segment as shown in FIG. 4, or select feature vectors of frames sampled at regular intervals as shown in FIG. 4. Other selection methods will be described below with reference to FIGS. 11 and 12.

The dimension selection means 102 selects, for each time segment, features of different dimensions of the feature vectors from the selected feature vectors of different frames within the time segment, according to information of the selected feature vectors of the frames for each time segment supplied from the intra-time segment feature vector group selection means 101, and outputs them as a time segment representative feature vector.

It should be noted that "selects features of different dimensions from the feature vectors of different frames" means selecting features of at least two different dimensions from the feature vectors of at least two different frames, rather than all of the frames and the dimensions of the selected features are selected without any overlaps.

The number of dimensions of the features selected by the dimension selection means 102 (that is, the number of dimensions of the time segment representative feature vector) may be any numbers. For example, if the number of dimensions of the feature vectors of a feature vector series given as an input is N, the number of dimensions of the features to be selected (the number of dimensions of the time segment representative feature vector) may be the same as N, or smaller than N, or larger than N.

As a method for selecting the features of different dimensions of the feature vectors from the selected feature vectors of different frames within the time segment by the dimension selection means 102, any methods can be used if it is constant to all of the input feature vector series.

Figure 5:
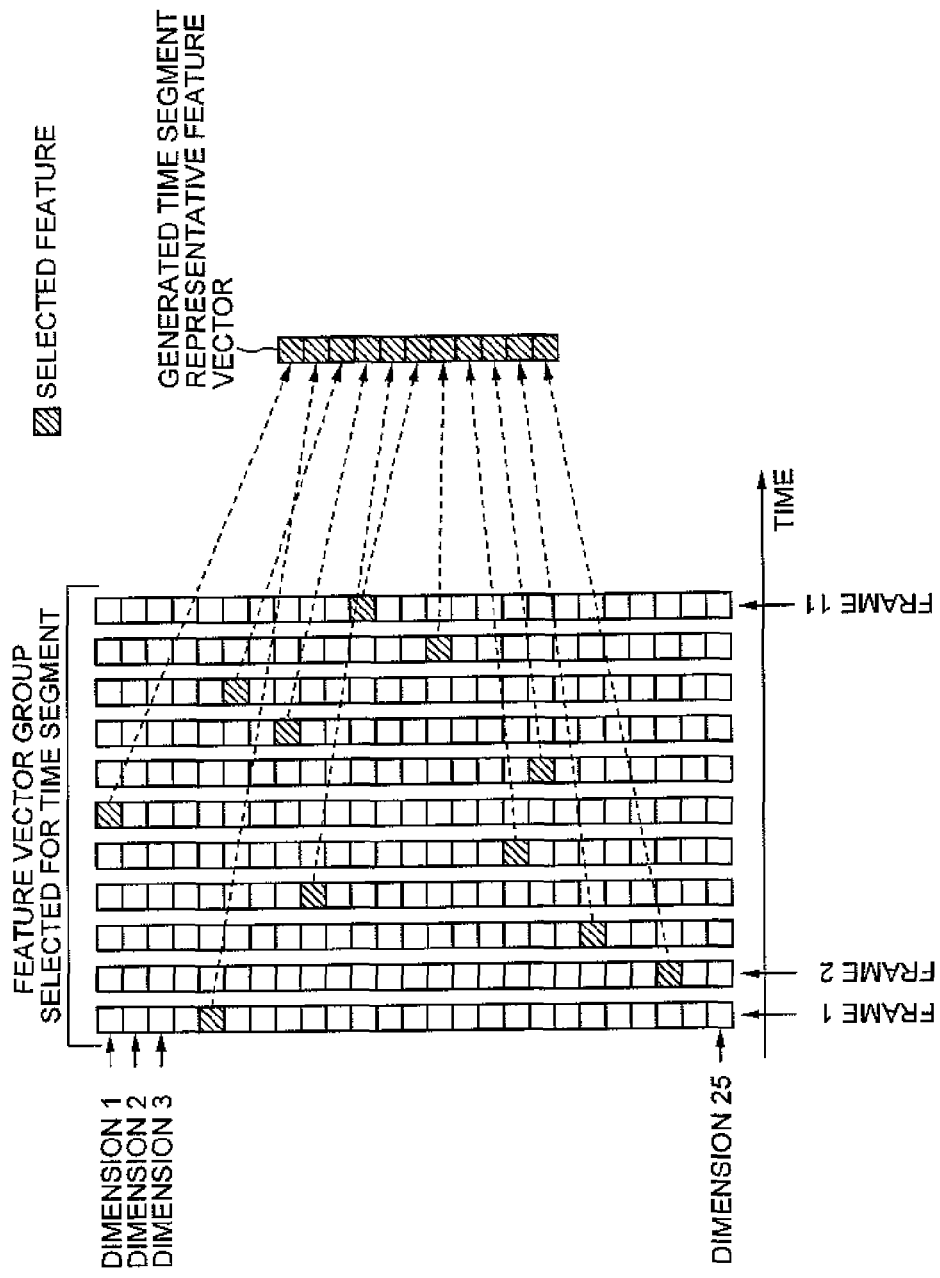
FIG. 5 shows an exemplary method of selecting features by a dimension selection means in the first embodiment of the present invention.

FIG. 5 shows a specific example thereof. FIG. 5 illustrates feature vectors of 11 frames, selected in a time segment, in time-series order. A feature vector of each of the frames is constituted of features in 25 dimensions. As such, this time segment includes 11 frames*25 dimensions=275 features. In FIG. 5, 11 features are selected from different dimensions of the feature vectors of different frames, and a feature vector in 11 dimensions constituted of the selected 11 features is generated as a time segment representative feature vector.

Figure 6:
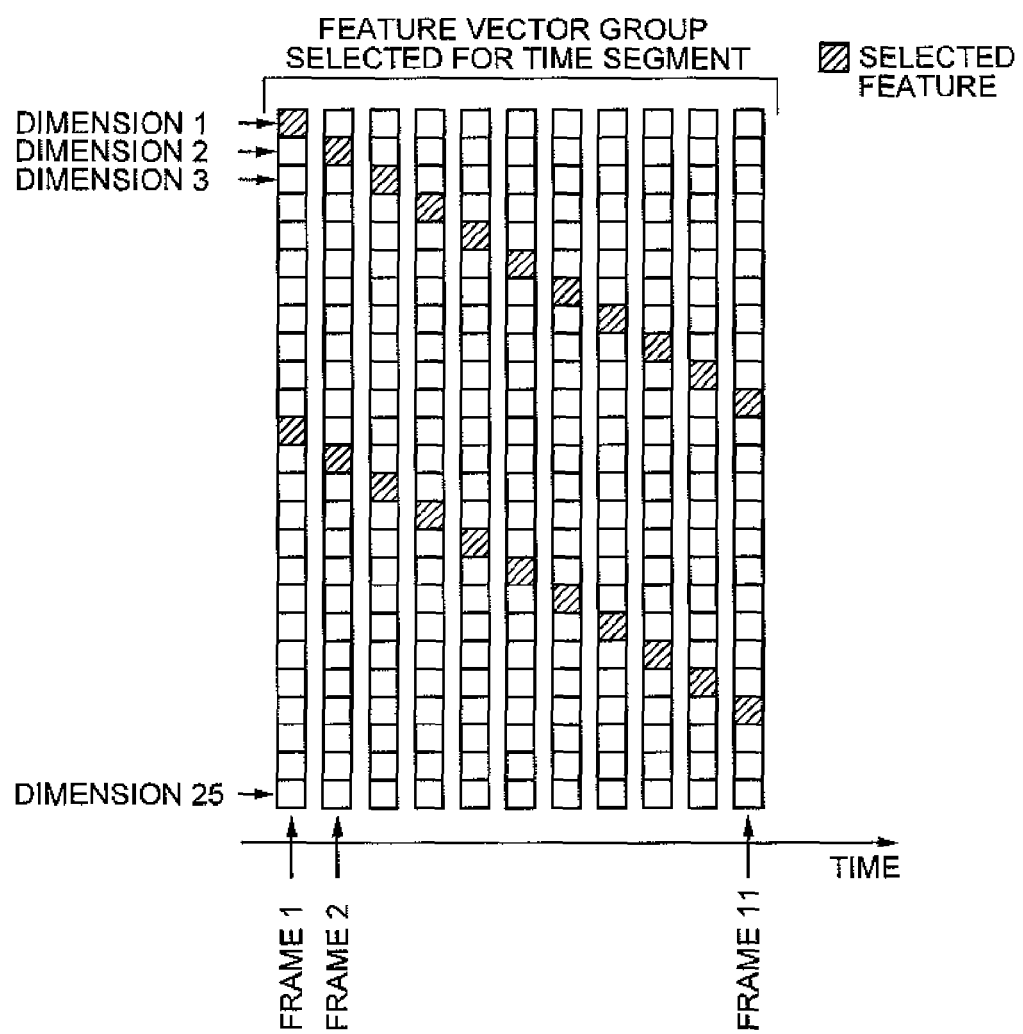
FIG. 6 shows another exemplary method of selecting features by the dimension selection means in the first embodiment of the present invention.
Figure 7:
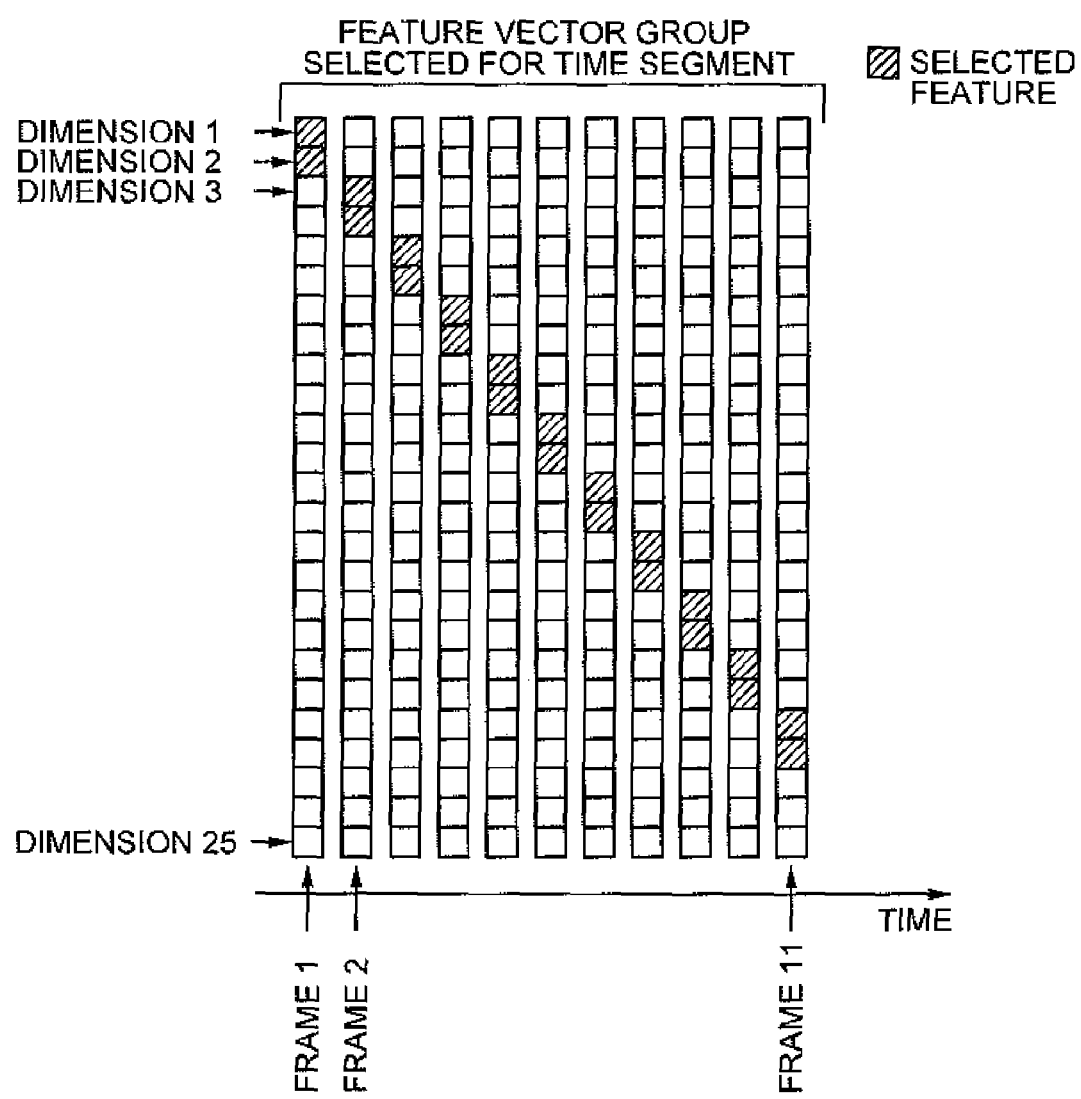
FIG. 7 shows still another exemplary method of selecting features by the dimension selection means in the first embodiment of the present invention.

FIGS. 6 and 7 show other exemplary methods of selecting features of different dimensions of the feature vectors from the selected feature vectors of different frames in a time segment by the dimension selection unit 102. In FIG. 6, 11 features are sequentially selected from respective dimensions 1 to 11 from the frames 1 to 11, and then 11 features are sequentially selected from respective dimensions 12 to 22 from the frames 1 to 11, and a feature vector in 22 dimensions constituted of the 22 features in total is generated as a time segment representative feature vector. Further, in FIG. 7, 22 features are sequentially selected from different dimensions of dimensions 1 to 22 of the frames 1 to 11, that is two dimensions each, and a feature vector in 22 dimensions constituted of the 22 features in total is generated as a time segment representative feature vector.

As shown in FIGS. 5 to 7, it is desirable that the dimension selection means 102 selects features of different dimensions of the feature vectors evenly from the selected frames in a time segment. For example, it is possible to select a feature of at least one dimension from all of the selected frames in a time segment. By evenly selecting features from a plurality of frames in a time segment, it is possible to constitute a segment representative feature vector including a large number of features of different times. This provides an advantageous effect that the discrimination capability of the feature vector series with respect to time-series changes can be improved, so that the retrieval accuracy of the feature vector series can be improved.

A time segment representative feature vector for each time segment, output by the time segment representative feature vector generation device 100, describes time-series changes of the feature vector series in the time segment. This is because features at a plurality of positions (times) on the time series in the time segment are aggregated. Further, as the features of different dimensions are selected, the generated time segment representative feature vector is an aggregate of features having different meanings (as features of different dimensions are features extracted through different procedures, their meanings are different). As described above, it can be said that the time segment representative feature vector output from the time segment representative feature vector generation device 100 is an aggregate of features having different meanings at different positions in the time segment. As such, it has no redundancy, and the segment feature representative feature vector has high description capability (discrimination capability), whereby retrieval can be performed with high accuracy.

By using the time segment representative feature vector for each time segment output from the time segment representative feature vector generation device 100, as it is possible to discriminate time-series changes in a time segment, retrieval of a feature vector series can be performed with high accuracy at a high speed for each time segment. A feature vector series retrieval system configured by using the time segment representative feature vector generation device 100 will be described below.

Description of Operation of First Embodiment

Figure 10:
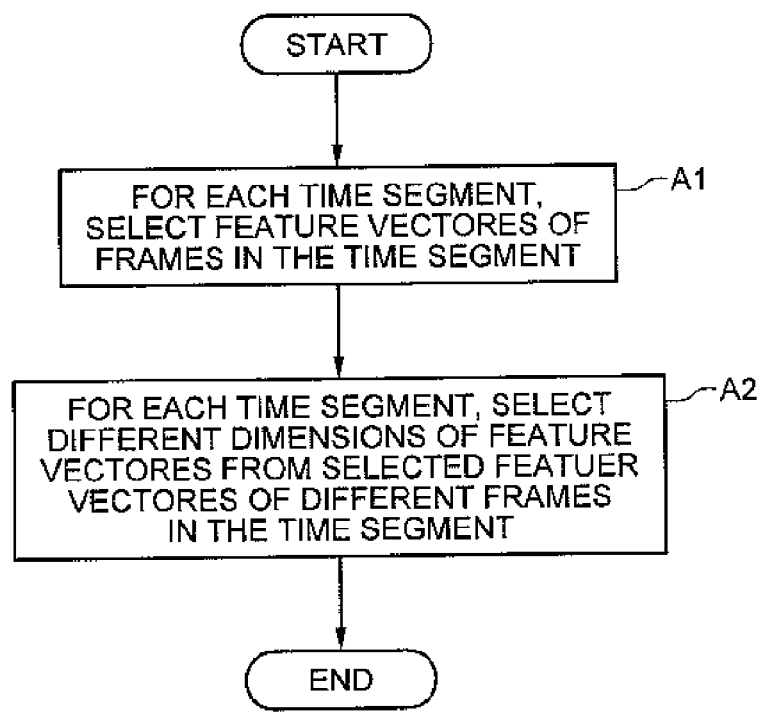
FIG. 10 is a flowchart showing operation of the first embodiment of the present invention.

Next, operation of the time segment representative feature vector generation device 100 according to the first embodiment will be described with reference to the flowchart of FIG. 10.

First, when a feature vector series is input, the intra-time segment feature vector group selection means 101 selects, for each time segment, feature vectors of a plurality of frames included in the time segment (step A1). Then, the intra-time segment feature vector group selection means 101 supplies information of the feature vectors of the frames selected for the time segment to the dimension selection means 102.

Next, from the information of the feature vectors of the frames selected for each time segment supplied from the intra-time segment feature vector group selection means 101, the dimension selection means 102 selects, for each time segment, features of different dimensions of the feature vectors from the selected feature vectors of different frames in the time segment (step A2), and outputs them as a time segment representative feature vector.

Effects of First Embodiment

According to the time segment representative feature vector generation device 100 of the first embodiment, a time segment representative feature vector capable of describing (discriminating) time-series changes in the feature vector series within a time segment can be generated. This is because by generating a time segment representative feature vector by selecting the features of different dimensions of the feature vectors from the feature vectors of different frame in a time segment, features at a plurality of positions (times) on the time series within the time segment are aggregated. As the time segment representative feature vector generated in this manner can discriminate time-series changes in a feature vector series within the time segment (can discriminate a feature vector series having different time-series changes), it is possible to improve the accuracy in retrieving a feature vector series.

Further, as the generated time segment representative feature vector is sampled from the original feature vector series, when performing matching thereof, a matching method may be identical to the original matching method of feature vectors for the respective original frames. As such, in a system for performing matching of a segment representative feature vector and matching in frame units in a hierarchical manner as in the case of a second feature vector series retrieval system which will be described below with reference to FIG. 9, there is an advantageous effect that a single circuit can be used for performing matching.

Second Embodiment

Figure 11:
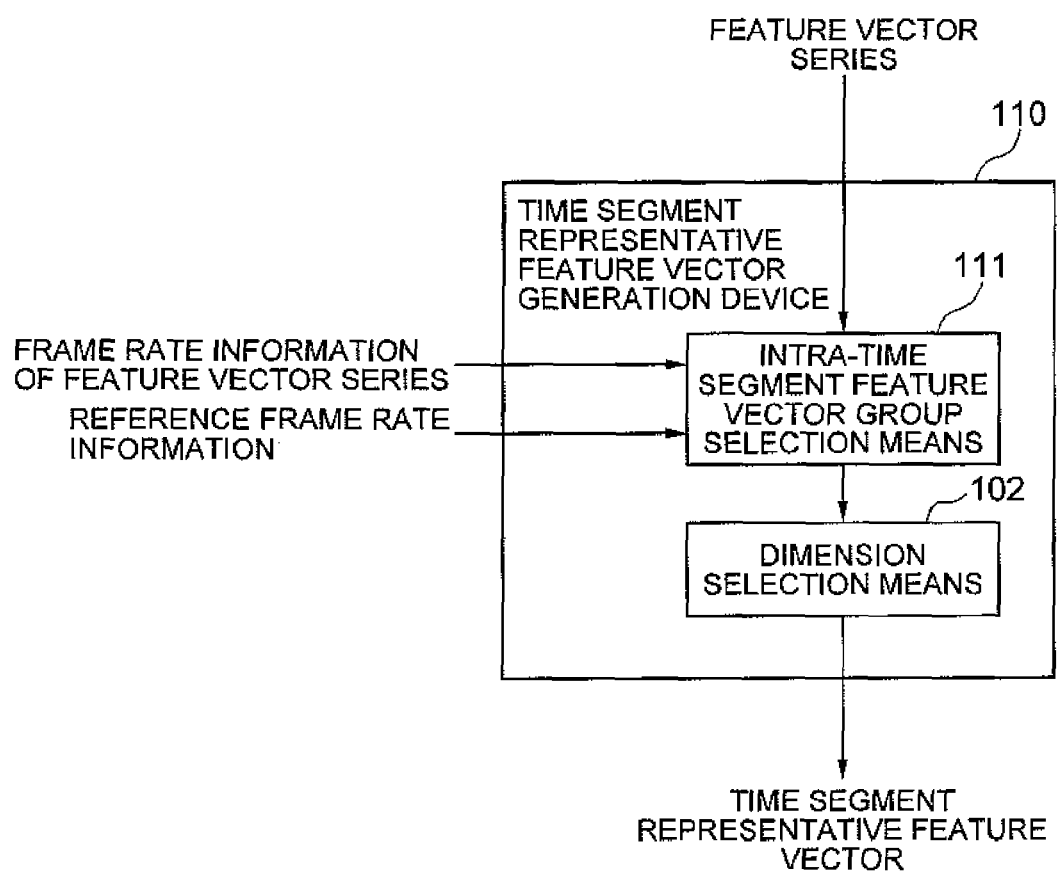
FIG. 11 is a block diagram showing the configuration of a second embodiment of the present invention.

Referring to FIG. 11, a time segment representative feature vector generation device 110 according to a second embodiment of the present invention is different in that the intra-time segment feature vector group selection means 101 of the time segment representative feature vector generation device 100 in the first embodiment is replaced with an intra-time segment feature vector group selection means 111.

To the intra-time segment feature vector group selection means 111, information indicating a frame rate of a feature vector series and information indicating a reference frame rate for generating a time segment representative feature vector are input. When a feature vector series is input, the intra-time segment feature vector group selection means 111 uses the frame rate of the feature vector series to specify the sample position in the reference frame rate from the feature vector series, selects feature vectors of a plurality of frames at the selected sample position, and supplies information of the feature vectors of the frames selected for each time segment to the dimension selection means 102.

Figure 12:
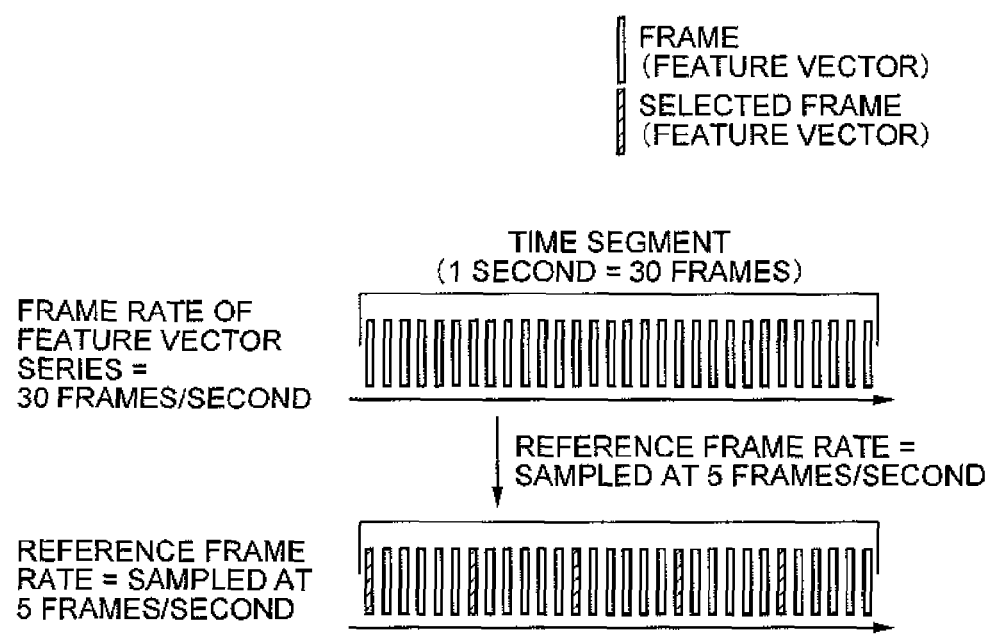
FIG. 12 shows an exemplary method for selection by an intra-time segment feature vector group selection means in the second embodiment of the present invention.

FIG. 12 shows a specific example thereof. In FIG. 12, it is assumed that the frame rate of a feature vector series is 30 frames/second, and that one second segment (that is, 30 frames) is set as a time segment. In this case, a reference frame rate for generating a time segment representative feature vector is assumed to be 5 frames/second. When information indicating 30 frames/second which is a frame rate of a feature vector series and information of 5 frames/second which is a reference frame rate are input, the intra-time segment feature vector group selection means 111 specifies a sample position corresponding to the 5 frames/second, which is the reference frame rate, in the feature vector series of 30 frames/second in the time segment.

As a method of specifying a sample position, it is possible to calculate a sampling interval as follows:

sampling interval (frame)=frame rate of a feature vector series/reference frame rate to thereby specifying the sample position. In this example, as a sampling interval=30/5=6, one frame may be sampled per six frames. If a sampling interval is not an integer value but a fractional value, it is only necessary to sample a frame at a sample position of an integer value obtained by rounding off the sample position calculated by the fraction.

The intra-time segment feature vector group selection means 111 selects a plurality of frames at the sample position specified in this manner and supplies the information to the dimension selection means 102.

Effects of Second Embodiment

According to the time segment representative feature vector generation device 110 of the second embodiment, comparable time segment representative feature vectors can be generated even for the feature vector series having different frame rates. This is because by using a reference frame rate for generating a time segment representative feature vector, a frame string of the feature vectors selected for generating a time segment representative feature vector is standardized to the reference frame rate.

For example, it is assumed that a first feature vector series in which the frame rate is 30 frames/second and a second feature vector series in which the frame rate is 15 frames/second are generated from the same moving image. These correspond to a feature vector series generated from a moving image X and a feature vector series generated from a moving image X' having a frame rate which is a half of that of the moving image X, for example. Now, it is assumed that one second segment is set as a time segment and that a reference frame rate for generating a time segment representative feature vector is set to 5 frames/second. In this case, from the first feature vector series, 5 frames are selected for each 6 frames from 30 frames, while from the second feature vector series, 5 frames are selected for each 3 frames from 15 frames. In this case, the 5 frames selected from the second feature vector series are the same as the 5 frames selected from the first feature vector series.

Thereby, it is possible to perform retrieval with high accuracy using a time segment representative feature vector even with respect to a feature vector series having a different frame rate.

Third Embodiment

Figure 13:
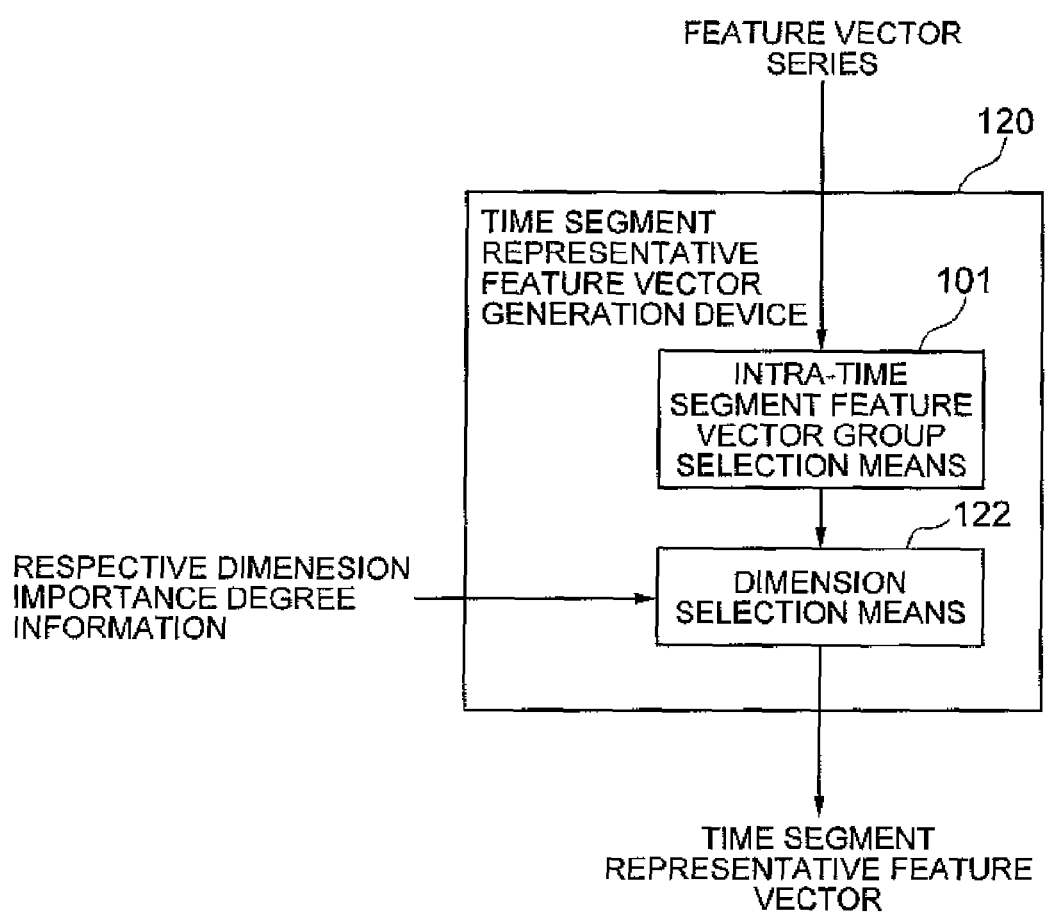
FIG. 13 a block diagram showing the configuration of a third embodiment of the present invention.

Referring to FIG. 13, a time segment representative feature vector generation device 120 according to a third embodiment of the present invention is different in that the dimension selection means 102 of the time segment representative feature vector generation device 100 according to the first embodiment is replaced with a dimension selection means 122.

To the dimension selection means 122, information indicating the degrees of importance of respective dimensions of a feature vector (respective dimension importance degree information) is input. From information of the feature vectors of the frames selected for each time segment supplied from the intra-time segment feature vector group selection means 101, the dimension selection means 122 selects, for each time segment, features of different dimensions of the feature vectors from the selected feature vectors of the different frames in the time segment according to the degrees of importance of the respective dimension in order from the highest degree of importance, and outputs them as a time segment representative feature vector.

The information indicating the degrees of importance of respective dimensions may be information in which the degrees of importance of the respective dimensions are quantified, information indicating the permutation of the degrees of importance of the respective dimensions, or information indicating the degrees of importance in two values of 1 or 0. While the meaning of degree of importance is arbitrary, it may be a degree of contribution of the feature of a dimension of a feature vector with respect to retrieval accuracy, a degree of discrimination capability (degree of capability of discriminating different data) held by the feature of a dimension of a feature vector, or a degree of robustness (resistance property with respect to various noise and processing applied to data) held by the feature of a dimension of a feature vector.

Figure 14:
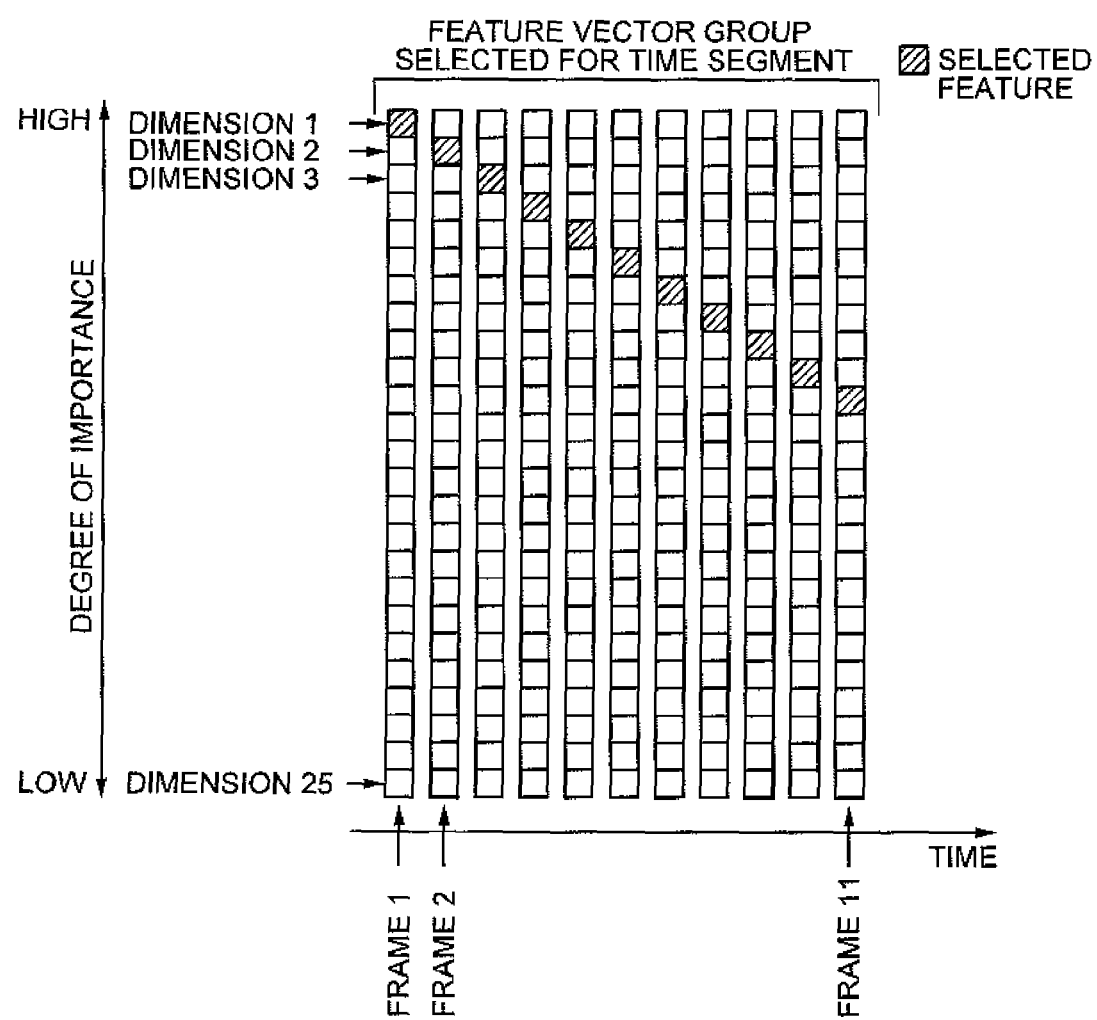
FIG. 14 is shows an exemplary method of selecting features by a dimension selection means in the third embodiment of the present invention.

FIG. 14 shows a specific example thereof. In FIG. 14, each feature vector of a feature vector series is constituted of features in 25 dimensions, which are dimensions 1 to 25. In this example, it is assumed that the degree of importance of each dimension is reduced as the dimension number increments. This means that the dimensions are aligned in order from the highest degree of importance, that is, the $1^{st}$ dimension has the highest importance and the $25^{th}$ dimension has the lowest importance. To the dimension selection means 22, information indicating that the dimensions are aligned in order from the highest importance is input as respective dimension importance degree information, and the dimension selection means 122 sequentially selects the feature of the dimensions of smaller numbers according to the information. In FIG. 14, features of 11 dimensions in total, from the $1^{st}$ dimension to the 11th dimension, are selected in order from the highest degree of importance, from the feature vectors in 25 dimensions.

Effects of Third Embodiment

According to the time segment representative feature vector generation device 120 of the third embodiment, a time segment representative feature vector can be generated from dimensions having higher degrees of importance of feature vectors. This is effective because when the number of dimensions of a time segment representative feature vector to be generated is reduced from the number of dimensions of the original feature vectors, dimensions having higher degrees of importance are selected.

Next, a feature vector series retrieval system configured of the time segment representative feature vector generation device according to the present invention will be described. While description is given for the case where the feature vector series retrieval system is configured using the time segment representative feature vector generation device 100, the system may be configured of the time segment representative feature vector generation device 110 of the second description or the time segment representative feature vector generation device 120 of the third embodiment, of course.

[First Feature Vector Series Retrieval System]

Figure 8:
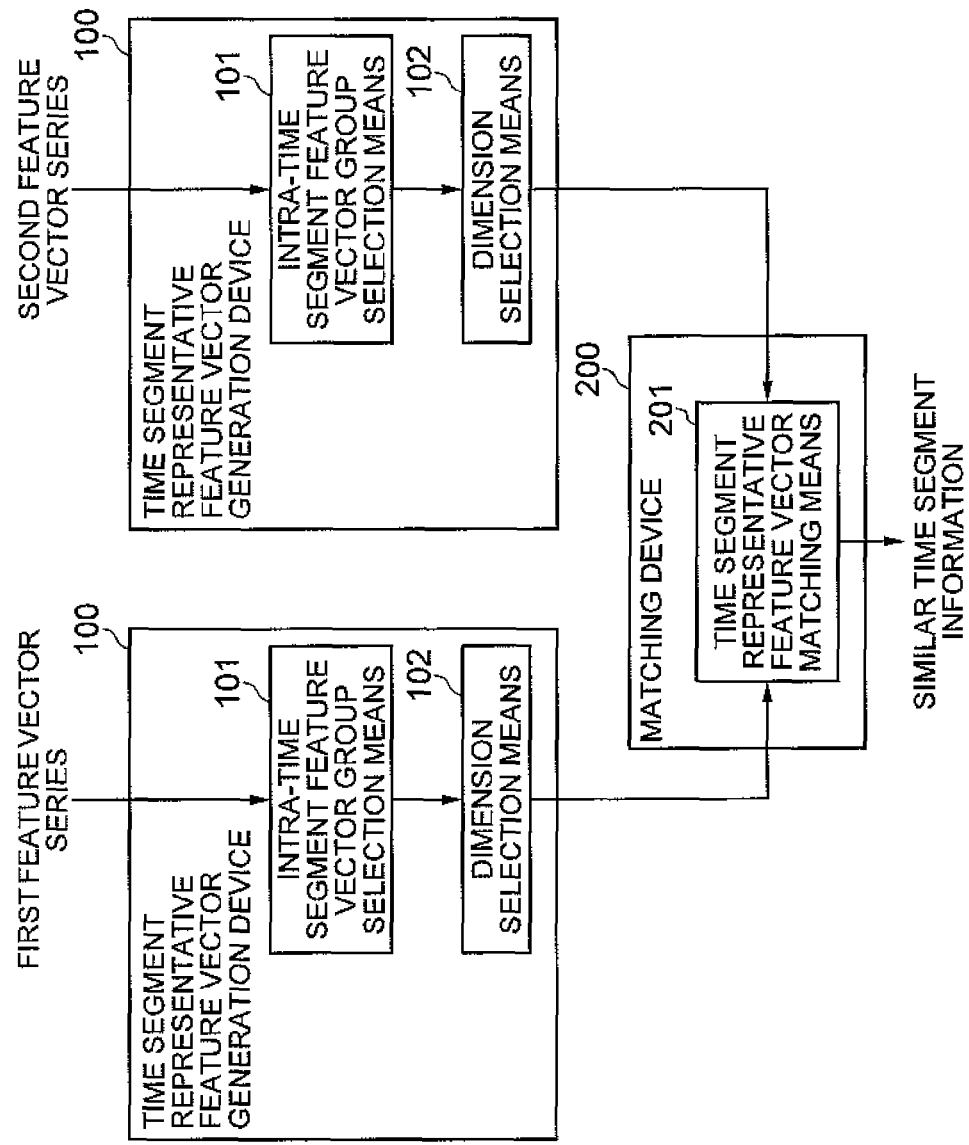
FIG. 8 is a block diagram showing the configuration of a first feature vector series retrieval system.

Referring to FIG. 8, a first feature vector series retrieval system according to the present invention includes the time segment representative feature vector generation device 100 and a matching device 200.

The time segment representative feature vector generation device 100 receives a first feature vector series and a second feature vector series, and outputs a time segment representative feature vector for each time segment of the first feature vector series and a time segment representative feature vector for each time segment of the second feature vector series. The output time segment representative feature vector for each time segment of the first feature vector series and the output time segment representative feature vector for each time segment of the second feature vector series are supplied to the matching device 200.

The matching device 200 includes a time segment representative feature vector matching means 201. The time segment representative feature vector matching means 201 performs matching between the time segment representative feature vector for each time segment of the first feature vector series and the time segment representative feature vector for each time segment of the second feature vector series, which are supplied from the time segment representative feature vector generation device 100, determines whether or not the time segment representative feature vectors are similar, and if it determines that they are similar, outputs information of the corresponding time segments as similar time segment information.

As a method of performing matching between a time segment representative feature vector corresponding to a time segment of the first feature vector series and a time segment representative feature vector corresponding to a time segment of the second feature vector series, the following method may be used. First, a degree of similarity between the time segment representative feature vectors to be compared is calculated. For example, a distance between the vectors (Euclidean distance, Hamming distance, etc.) or a similarity between the vectors (cosine similarity, etc.) is calculated to calculate the degree of similarity. In the case of using a distance between the vectors, the vectors are determined to be more similar as the value is smaller, while in the case of using a similarity between the vectors, the vectors are determined to be more similar as the value is larger. To the numerical value indicating the degree of similarity, threshold processing is applied using a predetermined threshold (the threshold is assumed to be given in advance) to determine whether or not they are similar. For example, if the distance between the vectors is used, the vectors are determined to be similar if the value is smaller than the predetermined threshold, while if the similarity between the vectors is used, the vectors are determined to be similar if the value is larger than the predetermined threshold. If it is determined that they are similar, information of the time segment in which the time segment representative feature vectors correspond to each other is output as similar time segment information. For example, if it is determined that the time segment representative feature vector corresponding to the frames from the $80^{th}$ frame to the $100^{th}$ frame of the first feature vector series and the time segment representative feature vector corresponding to the time segment of the frames from the $250^{th}$ frame to the $270^{th}$ frame of the second feature vector series are similar, the frames from the $80^{th}$ frame to the $100^{th}$ frame of the first feature vector series and the frames from the $250^{th}$ frame to the $270^{th}$ frame of the second feature vector series may be output as similar time segments, for example. This is an example of a matching method performed by the time segment representative feature vector matching means 201, and the present invention is not limited to this method.

According to the first feature vector series retrieval system, it is possible to realize retrieval of a feature vector series using time segment representative feature vectors at a high speed with high accuracy which is capable of discriminating time-series changes within a time segment.

[Second Feature Vector Series Retrieval System]

Figure 9:
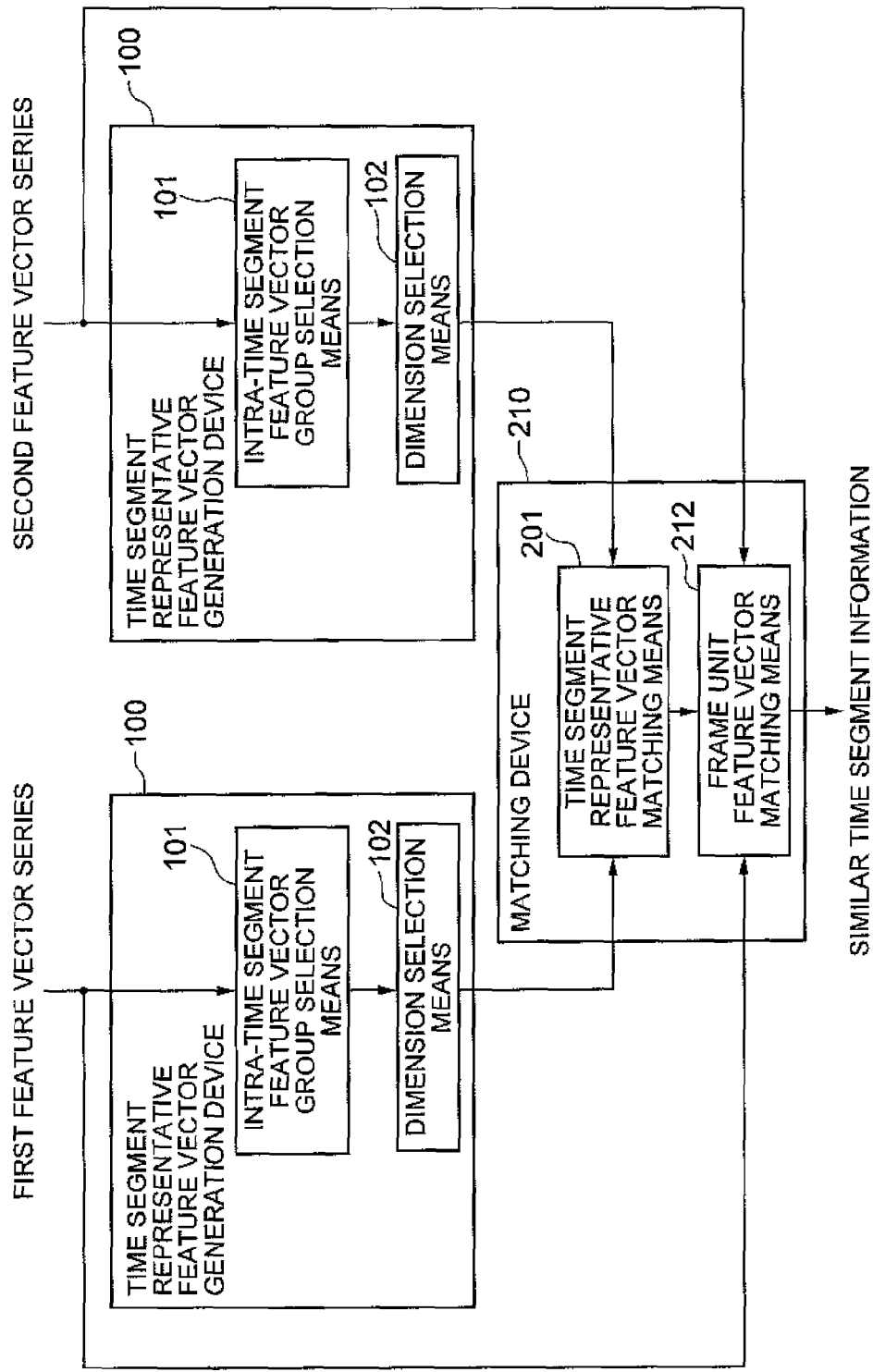
FIG. 9 is a block diagram showing the configuration of a second feature vector series retrieval system.

Referring to FIG. 9, a second feature vector series retrieval system according to the present invention is different in that the matching device 200 of the first feature vector series retrieval system is replaced with a matching device 210.

The matching device 210 includes the time segment representative feature vector matching means 201 and a frame unit feature vector matching means 202.

As the time segment representative feature vector matching means 201 is the same as that of the first feature vector series retrieval system, the description thereof is omitted.

The frame unit feature vector matching means 212 again performs matching in frame units between the feature vectors, of the input first feature vector series and second feature vector series, of the frames included in each time segment indicated by the similarity time segment information output from the time segment representative feature vector matching means 201, and if it determines that they are similar time segments, outputs similar time segment information.

When matching is performed between the feature vectors of the frames included in the similar time segment of the first feature vector series and the feature vectors of the frames included in the similar time segment of the second feature vector series in frame units, it is possible to calculate a degree of similarity (e.g., distance between vectors or similarity) between the feature vectors of the corresponding frames in the time segment (frames at the relatively same positions in the time segment), apply threshold processing, and if it is determined that they are similar continuously, determine to be similar time segments. This is an exemplary method performed by the frame unit feature vector matching means 212, and the present invention is not limited to this method.

According to the second feature vector series retrieval system, it is possible to perform retrieval of a feature vector series, as a first stage of retrieval, at a high speed with high accuracy capable of discriminating time-series changes in a time segment using a time segment representative feature vector, and with respect to the time segment determined to be similar in the retrieval, perform matching with higher accuracy using the original feature vector series in frame units (hierarchical matching and retrieval).

While the embodiments of the present invention have been described above, the present invention is not limited to these examples, and various additions and modifications may be made therein. Further, the time segment representative feature vector generation device and the matching device of the present invention are adapted such that the functions thereof can be realized by computers and programs, as well as hardware. Such a program is provided in the form of being written on a computer readable recording medium such as a magnetic disk, a semiconductor memory, or the like, is read by a computer when the computer is started for example, and controls operation of the computer, to thereby allow the computer to function as the time segment representative feature vector generation device and the matching device of the above-described embodiments.

This application is based upon and claims the benefit of priority from Japanese patent application No. 2009-17807, filed on Jan. 29, 2009, the disclosure of which is incorporated herein in their entirety by reference.

INDUSTRIAL APPLICABILITY

The present invention is applicable to retrieval of moving image data, acoustic data, and the like. For example, it is possible to retrieve desired contents from a database storing movie contents or music contents at a high speed. Further, it is also possible to use the present invention for detecting an illegal copy of moving image data or acoustic data illegally uploaded to the Internet or the like.

The invention claimed is:

1. A time segment representative feature vector generation device, comprising:
    an intra-time segment feature vector group selection unit that selects, for each time segment and from a feature vector series for respective frames, feature vectors of a plurality of frames included in a time segment; and
    a dimension selection unit that sequentially selects, for each time segment and from the selected feature vectors of different frames in the time segment, features of different dimensions of the feature vectors in accordance with predetermined degrees of importance of respective dimensions of the feature vectors starting from a dimension having a highest degree of importance, and generates a time segment representative feature vector which is a feature vector representing the time segment.

2. The time segment representative feature vector generation device, according to claim 1, wherein the feature vector series is a series of feature vectors for respective frames of moving image data.

3. The time segment representative feature vector generation device, according to claim 2, wherein the feature vector is calculated based on a difference value between features of two sub-regions forming a pair among a plurality of pairs of sub-regions in a frame of a moving image.

4. The time segment representative feature vector generation device, according to claim 1, wherein the dimension selection unit selects a feature of at least one dimension from the selected feature vectors of all frames in the time segment.

5. The time segment representative feature vector generation device, according to claim 1, wherein
    based on information indicating a frame rate of the feature vector series and information indicating a reference frame rate for generating a time segment representative feature vector, the intra-time segment feature vector group selection unit specifies a sample position in the reference frame rate from the feature vector series, and selects feature vectors of a plurality of frames at the specified sample position.

6. The time segment representative feature vector generation device, according to claim 5, wherein
    the intra-time segment feature vector group selection unit specifies the sample position based on a sampling interval defined by a ratio between the frame rate of the feature vector series and the reference frame rate.

7. A matching device, comprising
    a first matching unit that performs matching between a time segment representative feature vector for each time segment of a first feature vector series and a time segment representative feature vector for each time segment of a second feature vector series, generated by the time segment representative feature vector generation device according to claim 1, and determines whether or not both time segment representative feature vectors are similar.

8. The matching device, according to claim 7, further comprising
    a second matching unit that performs matching, with respect to a pair of time segment representative feature vectors determined to be similar by the first matching unit, between feature vectors of frames included in a corresponding time segment in frame units.

9. A time segment representative feature vector generation method, comprising:
    selecting, for each time segment and from a feature vector series for respective frames, feature vectors of a plurality of frames included in a time segment; and
    selecting, for each time segment and from the selected feature vectors of different frames in the time segment, features of different dimensions of the feature vectors in accordance with predetermined degrees of importance of respective dimensions of the feature vectors starting from a dimension having a highest degree of importance, and generating a time segment representative feature vector which is a feature vector representing the time segment.

10. The time segment representative feature vector generation method, according to claim 9, wherein the feature vector series is a series of feature vectors for respective frames of moving image data.

11. The time segment representative feature vector generation method, according to claim 10, wherein the feature vector is calculated based on a difference value between features of two sub-regions forming a pair among a plurality of pairs of sub-regions in a frame of a moving image.

12. The time segment representative feature vector generation method, according to claim 9, wherein the generating the time segment representative feature vector includes selecting a feature of at least one dimension from the selected feature vectors of all frames in the time segment.

13. The time segment representative feature vector generation method, according to claim 9, wherein
    the selecting the feature vectors of the plurality of frames includes, based on information indicating a frame rate of the feature vector series and information indicating a reference frame rate for generating a time segment representative feature vector, specifying a sample position in the reference frame rate from the feature vector series, and selecting feature vectors of a plurality of frames at the specified sample position.

14. The time segment representative feature vector generation method, according to claim 13, wherein
    the selecting the feature vectors of the plurality of frames includes specifying the sample position based on a sampling interval defined by a ratio between the frame rate of the feature vector series and the reference frame rate.

15. A matching method, comprising
    performing matching between a time segment representative feature vector for each time segment of a first feature vector series and a time segment representative feature vector for each time segment of a second feature vector series, generated by the time segment representative feature vector generation method according to claim 9, and determining whether or not both time segment representative feature vectors are similar.

16. The matching method, according to claim 15, further comprising
    with respect to a pair of the time segment representative feature vectors determined to be similar, performing matching between feature vectors of frames included in a corresponding time segment in frame units.

17. A computer readable memory storing a computer program comprising instructions for causing a computer to function as:
    an intra-time segment feature vector group selection unit that selects, for each time segment and from a feature vector series for respective frames, feature vectors of a plurality of frames included in a time segment; and
    a dimension selection unit that sequentially selects, for each time segment and from the selected feature vectors of different frames in the time segment, features of different dimensions of the feature vectors in accordance with predetermined degrees of importance of respective dimensions of the feature vectors starting from a dimension having a highest degree of importance, and generates a time segment representative feature vector which is a feature vector representing the time segment.

* * * * *

UNITED STATES PATENT AND TRADEMARK OFFICE
CERTIFICATE OF CORRECTION

PATENT NO. : 8,175,392 B2
APPLICATION NO. : 13/143673
DATED : May 8, 2012
INVENTOR(S) : Kota Iwamoto and Ryoma Oami It is certified that error appears in the above-identified patent and that said Letters Patent is hereby corrected as shown below:

Sheet 6 of 16 (Fig. 4), Line 8: Delete "SERIESS" and insert -- SERIES --, therefor Sheet 12 of 16 (block No. A2) (Fig. 10), Line 3: Delete "FEATUER" and insert -- FEATURE --, therefor Sheet 15 of 16 (Fig. 13), Line 11: Delete "DIMENESION" and insert -- DIMENSION --, therefor Column 5, Line 31: Delete "$0 \ (if \ |Vn1-Vn2| \leq th)$" and insert -- $0 \ (if \ |Vn1-Vn2| \leq th)$ --, therefor Column 5, Line 34: Delete "$-1 \ (if \ |Vn1-Vn2|>th$" and insert -- $-1 \ (if \ |Vn1-Vn2|>th$ --, therefor Column 10: Line 36: Delete "11th" and insert -- 11$^{th}$ --, therefor Signed and Sealed this
Twentieth Day of November, 2012

David J. Kappos
*Director of the United States Patent and Trademark Office*